United States Patent Office 3,153,337
Patented Oct. 20, 1964

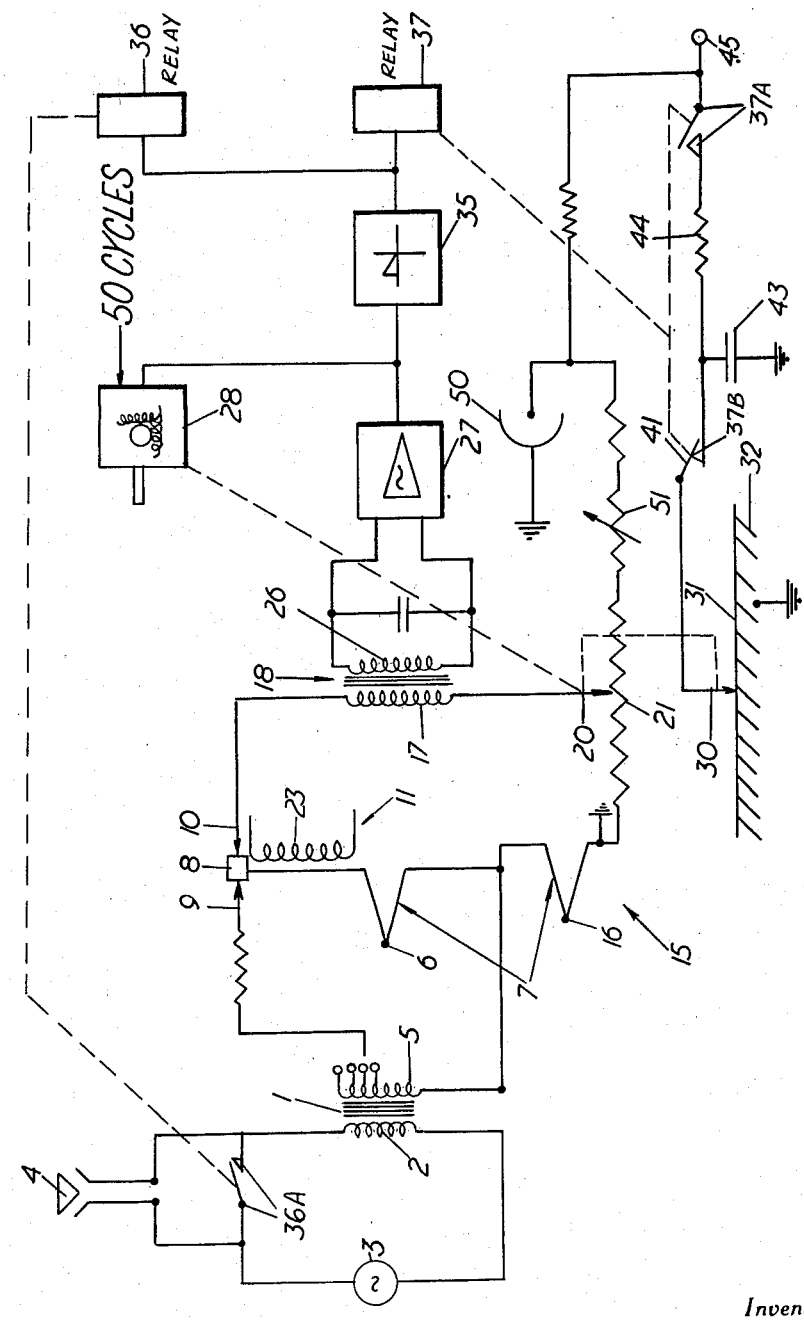
Inventors
ALBERT R. GILSON
LESLIE K. PARKER
By
Attorney

3,153,337
APPARATUS FOR DETERMINING THE MELTING POINT OF A MATERIAL
Albert Ralph Gilson, 12 Beechwood Road, and Leslie Kearton Parker, Lynwood, Candlemas Lane, both of Beaconsfield, England
Filed Aug. 5, 1960, Ser. No. 47,711
5 Claims. (Cl. 73—17)

The present invention is concerned with an apparatus for measuring the melting point of a sample of material, and according to this invention such apparatus comprises a heater for the sample, a resistance thermometer or a thermocouple (referred to as a thermometer) connected in an electric circuit which becomes unbalanced when the temperature of the sample rises, a mechanism operating in accordance with the unbalance to restore the circuit to a balanced state and to move an indicator, and means for operating when the balanced state is substantially attained, to give a record corresponding to the melting point of the sample. When a sample is placed on the thermometer and then heated by the heater, the temperature of the thermometer rises and the circuit becomes unbalanced. The mechanism operates to restore the circuit to a balanced state, but before this state can be attained the electric circuit has become unbalanced further owing to the continuous increase in temperature of the sample. As a result of this, during the time that the temperature of the sample is rising the circuit remains unbalanced by an amount depending on the speed with which the mechanism acts. When the sample melts, however, its temperature becomes substantially constant and as a consequence the mechanism is now able to bring the circuit into a substantially balanced state. When this happens, the means operates and a record corresponding to the melting point of the material may be thus obtained. The apparatus is thus an automatic one for it can be left unattended, and it does not require the use of a standard sample for every measurement. In addition, the apparatus may be constructed to measure the melting point of a very small sample, for example a sample having a total heat of fusion of only some $2.5 \times 10^{-3}$ calories.

Preferably the means is arranged to operate through the indicator.

If the means operates during the initial stages of the melting of the sample, the result obtained is not quite accurate and this is particularly the case when, as is mentioned below, the thermometer actually constitutes the heater. This arises because the temperature actually measured by the thermometer is that of the melted material actually in contact with the thermometer and this is generally somewhat higher than the true melting point. According to a preferred feature of the invention, therefore, the heater is rendered ineffective when the balanced state is substantially attained and the means operates only after a delay. The delay required is that necessary to ensure that the sample has reached the level temperature to which it falls on cessation of heating, and this delay may, therefore, be readily worked out from a knowledge of the size and characteristics of the sample under investigation. The temperature thus measured is the temperature of the material at the surface of the thermometer as this material actually solidifies. The delay may be brought about by an electromagnetic relay which is energised in accordance with the unbalance of the circuit but which operates only after a predetermined interval after the balanced state has been attained to cause the means to operate.

The heater may be separate from the thermometer and may, for example, be in the form of a radiator. Alternatively, however, the heater may be separate and in the form of an electrical resistance wire carrying a horizontal conducting plate, for example of platinum for the reception of the sample, and the thermometer may then be connected to this plate. Alternatively, however, the thermometer may actually constitute the heater, so that a single device acts in two different capacities.

One example of an apparatus according to the present invention will now be described with reference to the accompanying drawing which is a circuit diagram of the apparatus.

The apparatus includes a transformer 1, the primary winding 2 of which is connected to a 50 cycle supply 3 through a push button switch 4, and the secondary winding 5 of which is connected across the hot junction 6 of a thermocouple 7 through the moving contact 8 and one of the two static contacts 9 and 10 of a Carpenter relay 11. The thermocouple 7 is connected in an electric circuit 15 comprising, in series, the cold junction 16 of the thermocouple 7, the hot junction 6, the moving contact 8, the stationary contact 10, the primary winding 17 of a second transformer 18 the tapping point 20 of a potentiometer 21, and the potentiometer 21 itself, this being connected to the cold junction 16 and the connection being earthed. The potentiometer 21 comprises a resistance wire wound round a glass rod (not shown). The winding 23 of the Carpenter relay 11 is fed with a 50 cycle input, so that on alternate cycles the secondary winding 5 is connected across the hot junction 6 to cause it to heat up, whilst on the other half cycles the thermocouple 7 and the portion of potentiometer 21 to the left of the tapping point 20 are connected across the primary winding 17 of the transformer 18. A direct and constant potential is applied to the non-earthed end of the potentiometer 21 and as a consequence the potential across the primary winding 17 depends on the difference between the E.M.F. produced by the thermocouple 7 and the E.M.F. produced at the tapping point 20. Under balanced conditions, these last two E.M.F.'s are equal and opposite and as a consequence no potential exists across the winding 17, but as the temperature of the hot junction 6 rises the E.M.F. produced by the thermocouple 7 increases so that the circuit 15 becomes unbalanced and a potential is produced across the winding 17. This potential is, of course, an alternating potential, being in synchronism with the alternating input to the relay winding 23.

The alternating output from the secondary winding 26 of the transformer 18 is amplified by an amplifier 27 and is then applied to a two phase servo-motor 28 which is fed with a 50 cycle supply. This motor 28 is arranged to move the tapping point 20 so as to restore the circuit to a balanced state. It will be appreciated, therefore, that as the temperature of the hot sample rises uniformly under heat, the tapping point 20 is moved along the potentiometer 20 by the motor 28. This tapping point 20 is mechanically connected to an indicator in the form of an electrode 30 which is arranged to move along a length of "Teledeltos" paper 31 fixed temporarily on to a stationary support 32 in the form of a glass plate calibrated in ° C. The same glass is employed for this plate as for the rod around which the potentiometer wire 21 is wound so that the results obtained are independent of the temperature of the ambient atmosphere. The paper 31 is earthed. It will be appreciated that movements of the indicator 30 correspond to the rising temperature of the hot junction 6.

When a small sample placed on the hot junction 6 melts the temperature of the junction becomes substantially constant and as a consequence the motor 28 is able at last to move the tapping point 20 into a position to balance the circuit 15 so that the output of the winding 26 rapidly falls in magnitude. This output is rectified by a rectifier 35 and this rectified output is arranged to control two electromagnetic relays 36 and 37. The relay 36 has contacts 36A arranged across the push button switch 4, so that after the push button has been operated and released these contacts 36A are closed by the relay 36 so as to by-pass the switch. When the output from the winding 26 falls, these contacts 36A are immediately opened and the heating of the sample then ceases. The relay 37 has two pairs of contacts 37A and 37B. The contacts 37A are closed by the relay 37 when the circuit 15 is in its unbalanced state and thereby permits a capacitor 43 to be charged up through a resistor 44, a direct potential of some 250 volts being applied to a terminal 45 in the apparatus. The other contacts 37B are connected between the electrode 30 and the capacitor 43. These contacts 41 are normally out of engagement so that the capacitor 43 cannot discharge through the Teledeltos paper. However, when the output from the winding 26 falls upon attainment of substantially balanced conditions in the circuit 15, the relay 37 (which has a slow release slug), after a delay of, for example, 300 milliseconds, closes the contacts 37B and the capacitor 43 discharges so that a record is obtained on the Teledeltos paper, enabling the melting point to be read off from the calibrated glass plate 32. This record is obtained at a time when the small sample of material has partly solidified again as a result of cessation of heating. As already indicated, the delay necessary varies depending on the size of the sample employed and this is readily determined for any particular sample, and the appropriate delay obtained by the slug.

The thermocouple 7 is made of noble metal so that a sample may, after investigation, be burnt off without damaging the thermocouple simply by passing a heavy current. Each junction 6 and 7 is arranged to point upwards vertically, so that a small block of ice may be placed over the cold junction 16 and the sample under investigation over the hot junction 6. The sample is, in fact, placed in a platinum cup (not shown) which is secured to the hot junction, and which is provided with a glass cover slip. The thermocouple 7 may be unplugged from the apparatus and replaced by another one. It may be placed in a vacuum if desired.

The potential applied to the non-earthed end of the potentiometer 21 is stabilised by a discharge tube 50. This stabilised potential is applied to the non-earthed end of the potentiometer 21 through a rheostat 51, so that the potential across the potentiometer 21 may be adjusted as desired. This enables effects due to the ageing of the thermocouple 7 and the discharge tube 50 to be avoided. Thus, if it is suspected that these effects are becoming significant, a considerable quantity of substance of accurately known melting point is placed on the hot junction 6 and when melting is about to start the push-button 4 is held permanently depressed and the rheostat is adjusted until the electrode 30 indicates the known melting point.

In a somewhat modified construction (not shown) the electrode 30 is a stationary one and it is the plate 32 which is moved by the motor 28 and which thus constitutes an indicator to show the melting point of the sample. In this modified construction (as in the construction illustrated) the discharge from the capacitor 43 does not take place through the plate 32.

We claim:
1. Apparatus for measuring the melting point of a sample of material comprising sample heating means, circuit means including a thermocouple located adjacent said sample heating means to sense the heat of said sample material and having an unbalanced output as the temperature of the sample rises, mechanism controlled by the unbalanced output to restore the said circuit means to a balanced condition, responsive means having first and second discrete conditions, and means whereby said responsive means is maintained in said first discrete condition when the circuit means is in an unbalanced condition and in said second discrete condition when said circuit means is substantially balanced to provide an indication of the melting point of said sample.

2. Apparatus according to claim 1 in which the means to heat the sample is rendered ineffective upon a balanced condition of said circuit means.

3. Apparatus as set forth in claim 1 in which the responsive means includes time delay means whereby the operation of the responsive means occurs a predetermined period of time after the circuit is balanced.

4. Apparatus according to claim 1 in which the thermocouple constitutes the means to heat the sample.

5. Apparatus for determining the melting point of a material comprising a first circuit including a thermocouple, means to heat a sample of material located at said thermocouple whereby said first circuit produces a first output potential in accordance with the temperature of said sample, said output being substantially constant at the point at which the sample material melts, second circuit means producing a second potential connected serially to said first circuit means and in opposition thereto, means responsive to the difference of said first and second potentials to control the second potential in a direction to balance the first and second potential, responsive means having first and second discrete conditions, and means whereby said responsive means is maintained in said first discrete condition when the circuit means is in an unbalanced condition and in said second discrete condition when said circuit means is substantially balanced to provide an indication of the melting point of the material.

References Cited in the file of this patent

UNITED STATES PATENTS

| | | |
|---|---|---|
| 1,259,363 | Chubb | Mar. 12, 1918 |
| 1,291,409 | Chubb et al. | Jan. 14, 1919 |
| 2,036,432 | Musante et al. | Apr. 7, 1936 |
| 2,475,362 | Tinkam et al. | July 5, 1949 |
| 2,585,934 | Haswell | Feb. 19, 1952 |
| 2,877,650 | Koletsky | Mar. 17, 1959 |